United States Patent [19]

Somlyody et al.

[11] Patent Number: 5,083,288

[45] Date of Patent: Jan. 21, 1992

[54] APPARATUS FOR CONFIGURING A REMOTE PROCESS SENSOR AND SIGNAL TRANSMITTER

[76] Inventors: Arpad Somlyody, 14 Saxon La., Shrewsbury, 01545; Paul C. Neilson, 1312 Salem St., North Andover, Mass. 01845

[21] Appl. No.: 630,803

[22] Filed: Dec. 24, 1990

Related U.S. Application Data

[63] Continuation of Ser. No. 315,305, Feb. 24, 1989, abandoned.

[51] Int. Cl.$^5$ .............................................. G06F 15/00
[52] U.S. Cl. ............................... 364/550; 364/571.01; 364/172; 364/557
[58] Field of Search .................... 364/550, 551.01, 148, 364/152, 167.01, 172, 174–175, 571.01–571.03, 571.05, 571.07, 557; 73/1 R; 374/1

[56] References Cited

U.S. PATENT DOCUMENTS

| | | | |
|---|---|---|---|
| Re. 31,750 | 11/1984 | Morron | 364/550 |
| 4,162,531 | 7/1979 | Rode et al. | 324/77 R X |
| 4,368,509 | 1/1983 | Li | 364/148 |
| 4,372,692 | 2/1983 | Thomae | 364/557 X |
| 4,388,692 | 6/1983 | Jones et al. | 364/557 |
| 4,414,638 | 11/1983 | Talambiras | 364/571.07 |
| 4,472,770 | 9/1984 | Li | 364/148 |
| 4,494,212 | 1/1985 | Mueller | 364/571.07 |
| 4,507,740 | 3/1985 | Star et al. | 324/77 R X |
| 4,630,224 | 12/1986 | Sollman | 364/550 |
| 4,807,166 | 2/1989 | Zalenski | 364/571.06 |
| 4,829,459 | 5/1989 | McNutt | 364/571.05 X |
| 4,841,459 | 6/1989 | Ikeda et al. | 364/557 |
| 4,910,660 | 3/1990 | Li | 364/148 |
| 4,931,967 | 6/1990 | Boe et al. | 364/571.01 |
| 4,947,355 | 8/1990 | Koeman | 364/571.01 |
| 4,947,484 | 8/1990 | Twitty et al. | 371/32 X |
| 4,974,181 | 11/1990 | Sinderson et al. | 364/550 |

*Primary Examiner*—Joseph L. Dixon
*Attorney, Agent, or Firm*—Robert A. Green

[57] ABSTRACT

The disclosure is of a remote process sensor and signal transmitter including apparatus for configuring the sensor and transmitter to perform various functions. The transmitter includes a program and apparatus for cycling through the program and the system microprocessor to set into the transmitter various conditions including its temperature range of operation, one of many possible remote temperature sensors and other operating states. The program includes two portions each of which can be entered by a switch. Each portion of the program can be cycled through and as selected portions of the program are reached, a selected parameter can be set into the microprocessor as a permanent operating condition. The set operating conditions can be set or reset at any time by cycling through the program in accordance with the set protocol.

5 Claims, 7 Drawing Sheets

APPARATUS FOR CONFIGURING A REMOTE PROCESS SENSOR AND SIGNAL TRANSMITTER

This is a continuation of co-pending application Ser. No. 07/315,305 filed on Feb. 24, 1989, now abandoned.

BACKGROUND OF THE INVENTION

The apparatus of the invention is particularly useful with devices known as "smart two-wire process transmitters", however, the principles can be used with numerous other devices that must be set up or configured in one of a multitude of different modes depending on the application.

Devices known as process signal transmitters accept one form of various low level signals from a sensor or transducer and convert such signals to a standard form known as a 4 to 20 mA current. Such signal transmitters are used in the chemical and process industries and are used when measuring temperature, pressure, flow, level and the various other process variables.

Generally to measure each of these different process variables a different design transmitter is required. Transmitters that are designed using classical analog circuit technology even require different models of transmitters depending on the range of the measured variable.

The purpose of such a transmitter is to take the low level (microvolt and millivolt level) signals available from thermocouples, strain gages and other sensors; convert these low level signals near the location of the sensor to a suitable high level signal, and then with a much higher degree of noise immunity, transmit such higher level signals to some desired remote location within the same plant, such as the control room. The low level signals directly out of the sensor are easily affected by electromagnetic interference, signal loss due to line resistance, ground loop interference and various other causes, thus degrading the accuracy of measurement. The 4 to 20 mA current signal has been estabilshed as an industry standard because analog signals transmitted in this fashion are much less affected by other interfering signals, thus helping to preserve the measurement accuracy.

The term "4 to 20 mA loop" refers to an analog signal transmission standard adopted by the process industry. According to this standard, an analog signal to be transmitted some distance, usually within the confines of a manufacturing plant, is converted to a current signal in the range of 4 mA and 20 mA. A certain value of the measured parameter can be made to correspond to the 4 mA value of the output. This is usually referred to as the LRV (Lower Range Value) or "zero". A certain other value of the measured parameter is then made to correspond to the 20 mA value of the output. This is them referred to as the URV (Upper Range Value). The difference in inpt signals between the URV and the LRV is referred to as the "span". The output current will then vary between the 4 and 20 mA values as the measured parameter changes between its LRV and URV values.

For the past several decades, two-wire process signal transmitters have used analog circuit technology implemented using transistors and later various integrated circuit operational amplifiers, OPAMP. Numerous small improvements to these analog transmitters have been developed over the years, however, the analog signal transmitter technology is now considered to be mature. Improvements are generally of the nature of refinements of the existing technology, rather than solutions to major unresolved problems. Process signal transmitters using "analog only" technology continue to have major performance shortcomings which significantly affect their measurement accuracy and ease of use.

In recent years some companies have introduced "Smart" or "Intelligent" two wire process transmitters.

All of these smart two wire transmitters are distinguished from their analog predecessors by utilizing one or more microprocessors for their operation. The present invention includes a technologically advanced smart temperature transmitter which provides a major step improvement in performance, and many new and desired features which could not be achieved in earlier analog transmitters.

Where there is a microprocessor as part of a system, like it is in a smart two wire transmitter, implementing digital communications with another data terminal or computer is a relatively simple matter. The microprocessor has the facility to handle all of the digital data communications tasks required. For this reason all of the smart two wire transmitters offer some form of digital communications with either a hand held terminal or a process computer (a computer used to control a chemical process). Such digital communications in a smart two wire tranmsitter are used to select the desired sensor, or to select the desired zero and span for the output, or to set the open sensor alarm state, and to perform other similar set up functions.

Smart transmitters offer a wide range of versatility and, therefore, require to be "told" much more information to set them up or configure them in the desired mode. The following is a typical list of decisions the user needs to make and somehow convey to the transmitter to properly configure it prior to use:

SENSOR SELECTION

Type E Thermocouple
Type J Thermocouple
Type K Thermocouple
Type T Thermocouple
Type R Thermocouple
Type S Thermocouple
Type B Thermocouple
Type N Thermocouple
RTD Pt 100 ohm DIN curve 2/4 wire
RTD Pt 100 ohm DIN curve 3 wire
RTD Pt 100 ohm US curve 2/4 wire
RTD Pt 100 ohm US curve 3 wire
RTD Ni 120 ohm Minco curve 2/4 wire
RTD Ni 120 ohm Minco curve 3 wire
Milivolt input −10 to 120 mV

SENSOR FAILURE ALARM

If the sensor fails through open or short circuit the output can be driven to either 21 mA or 4 mA as an alarm condition.
Sensor Failure HIGH
Sensor Failure LOW

TRANSMITTER FAILURE ALARM

Certain internal failures within the transmitter can be reported as either a 21 mA or a 4 mA output condition.
Transmitter Failure HIGH
Transmitter Failure LOW

CALIBRATE 4.00 mA

The 4.00 mA limit of the transmitter can be checked or readjusted against an external calibrated milliammeter.

CALIBRATE 20.00 mA

The 20.00 mA limit of the transmitter can be checked or readjusted against an external calibrated milliammeter.

SET ZERO

By applying a desired known millivolt input the "zero" can be made to correspond to that input.

SET SPAN

By applying a desired known millivolt input the "span" can be made to correspond to that input.

As the above table indicates a smart trnamitter requires numerous selections and adjustments before it is properly configured.

One possible method for configuring uses potentiometers and switches. However, these are costly components and are usually the least reliable. A further cost and reliability problem is to provide a weather tight access to such components.

Another method uses expensive auxiliary devices such as computer display terminals and modems which facilitate ditital communications with the smart process transmitter. This is also complex and expensive.

SUMMARY OF THE INVENTION

The present invention provides a relatively simple and efficient apparatus and method for configuring a smart transmitter for sensing a wide variety of conditions. The transmitter includes a microprocessor containing a configuration program which can be sequenced by means for two shorting terminals one of which sequences through the program and the other of which is used to select and store configuration data. The shorting terminals apply potential to the microprocessor which causes the desired sequencing. The range of temperature to which the transmitter can respond and various other conditions can be set the invention.

DESCRIPTION OF THE DRAWNGS

DESCRIPTION OF THE INVENTION

In the present invention, a smart two wire transmitter is described which in addition to being able to digitally communicate, like most other smart two wire transmitters, it also offers a unique method of configuration and reconfiguration hereafter referred to as TAP-FEEDBACK method. The TAP-FEEDBACK method requires no expensive hand held communicator and is capable of setting up or configuring or reconfiguring a smart transmitter in much the same way as digital communications allows one to do. In addition, the TAP-FEDDBACK feature of the invention permits a smart two wire transmitter to be sold at a price which is competitive with inferior analog transmitters.

Figure 1A:
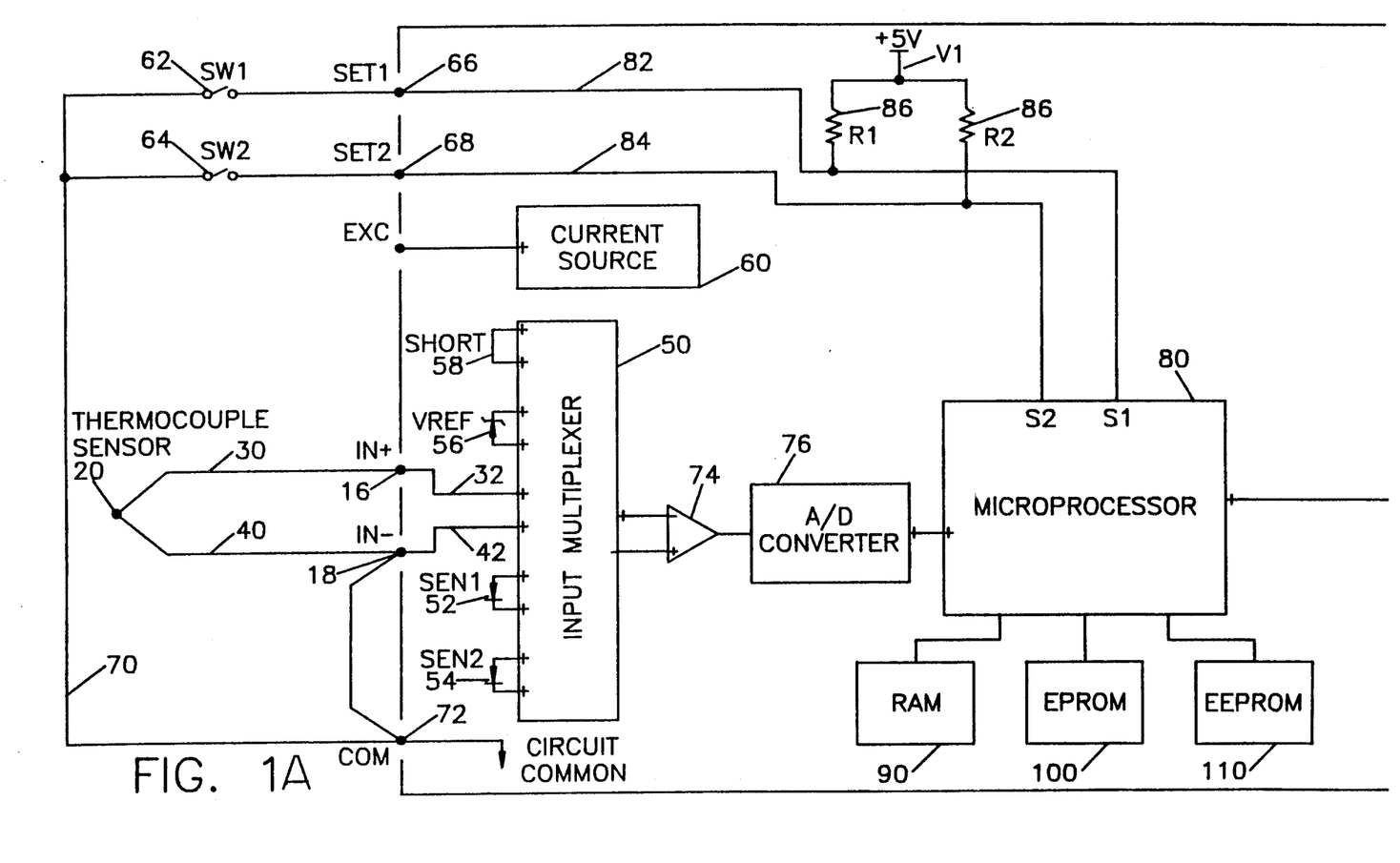
FIGS. 1A and 1B are a schematic representation of a typical remote sensor and two-wire signal transmitter which can be configured according to the invention.
Figure 1B:
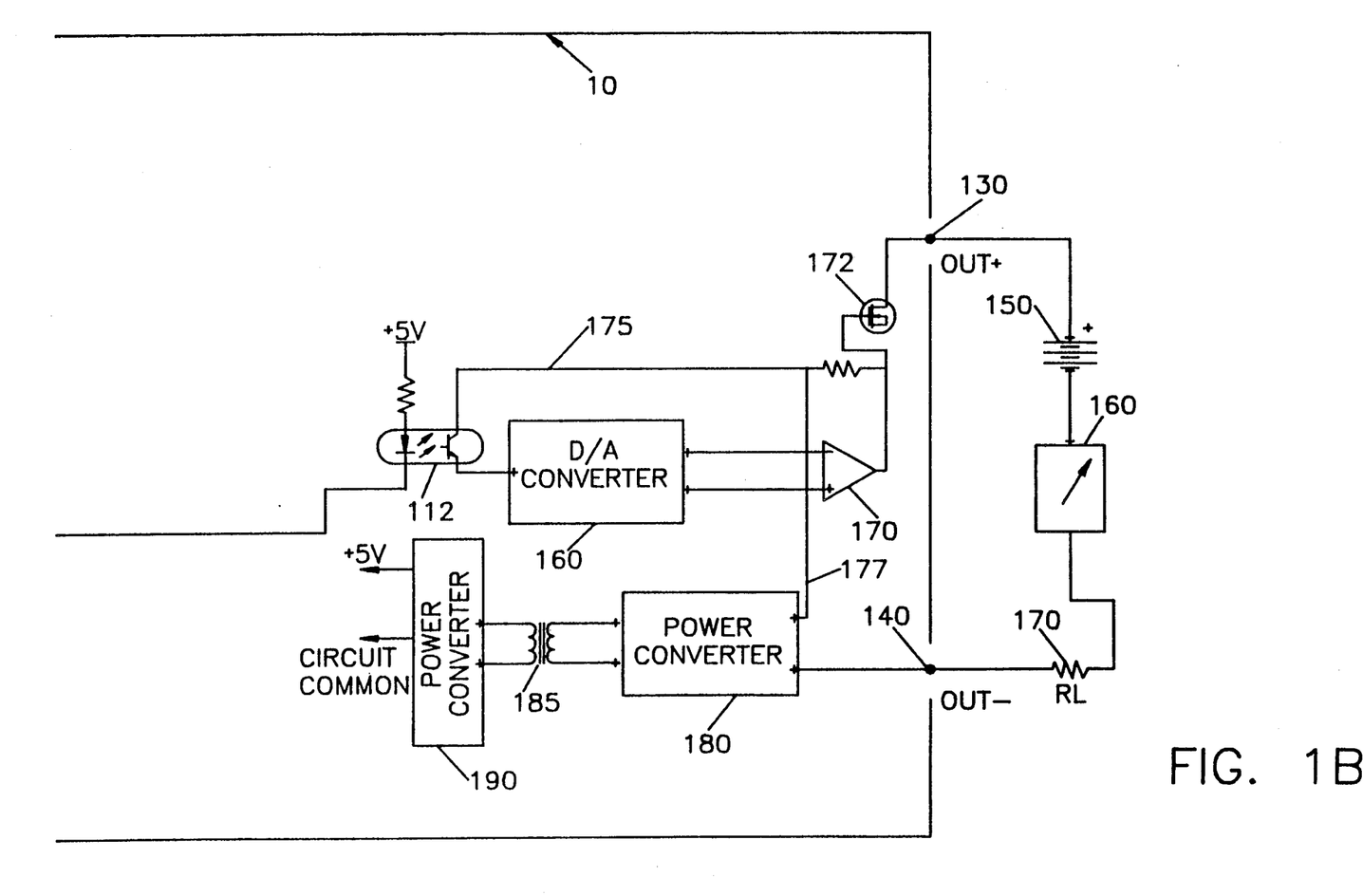
Figure 2A:
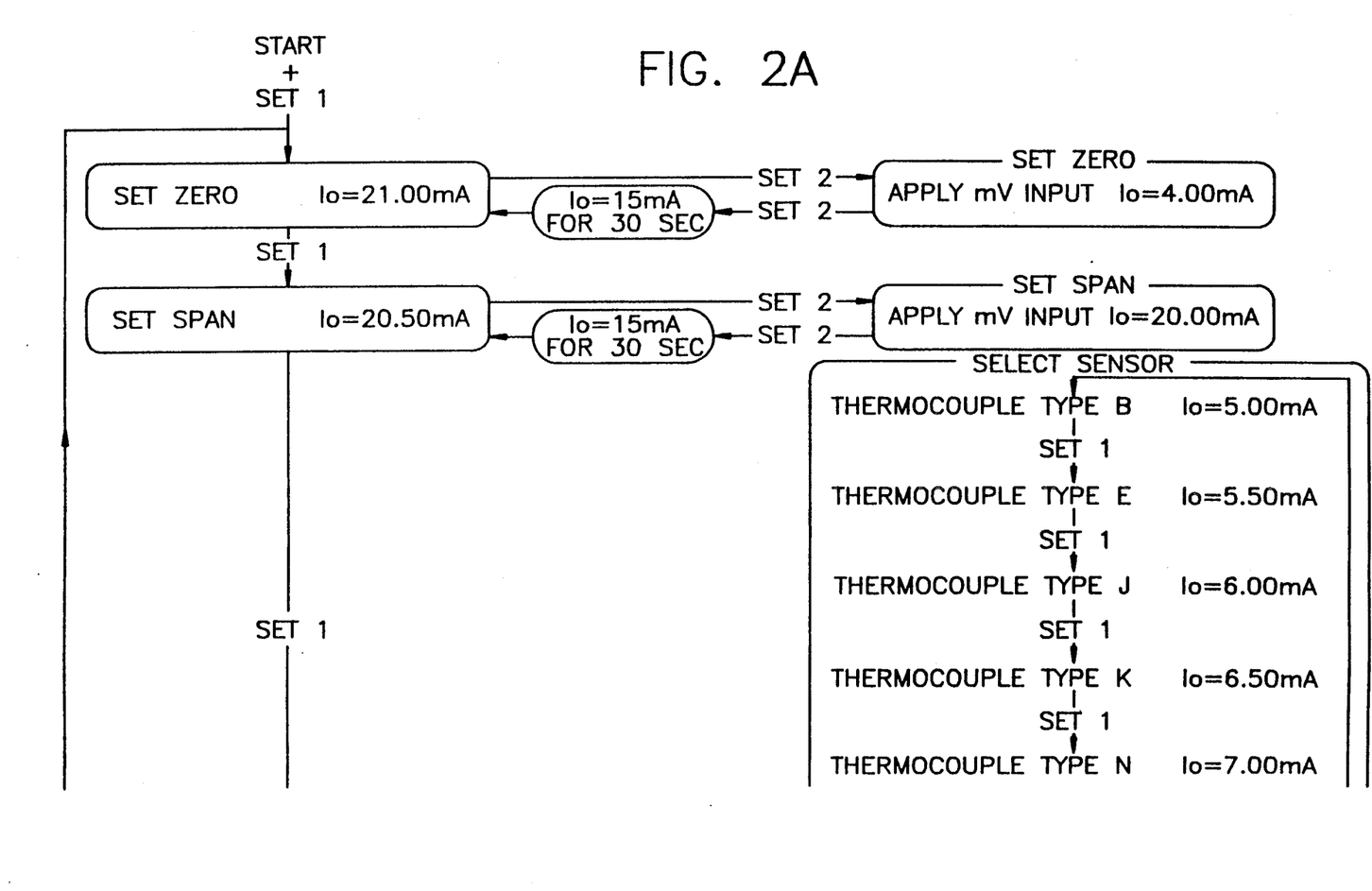
FIGS. 2A-E are a flow chart used in operating the invention.
Figure 2B:
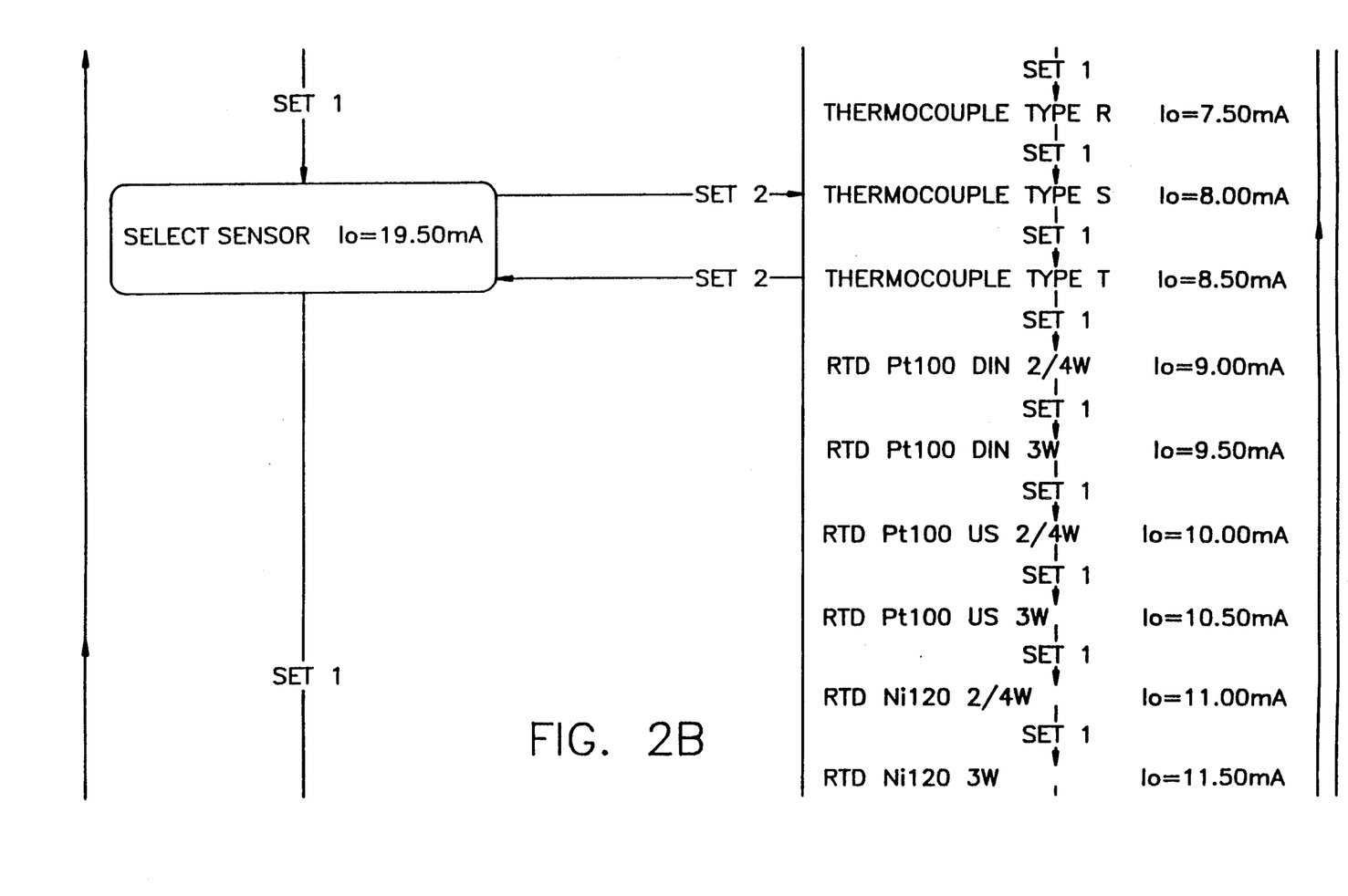
Figure 2C:
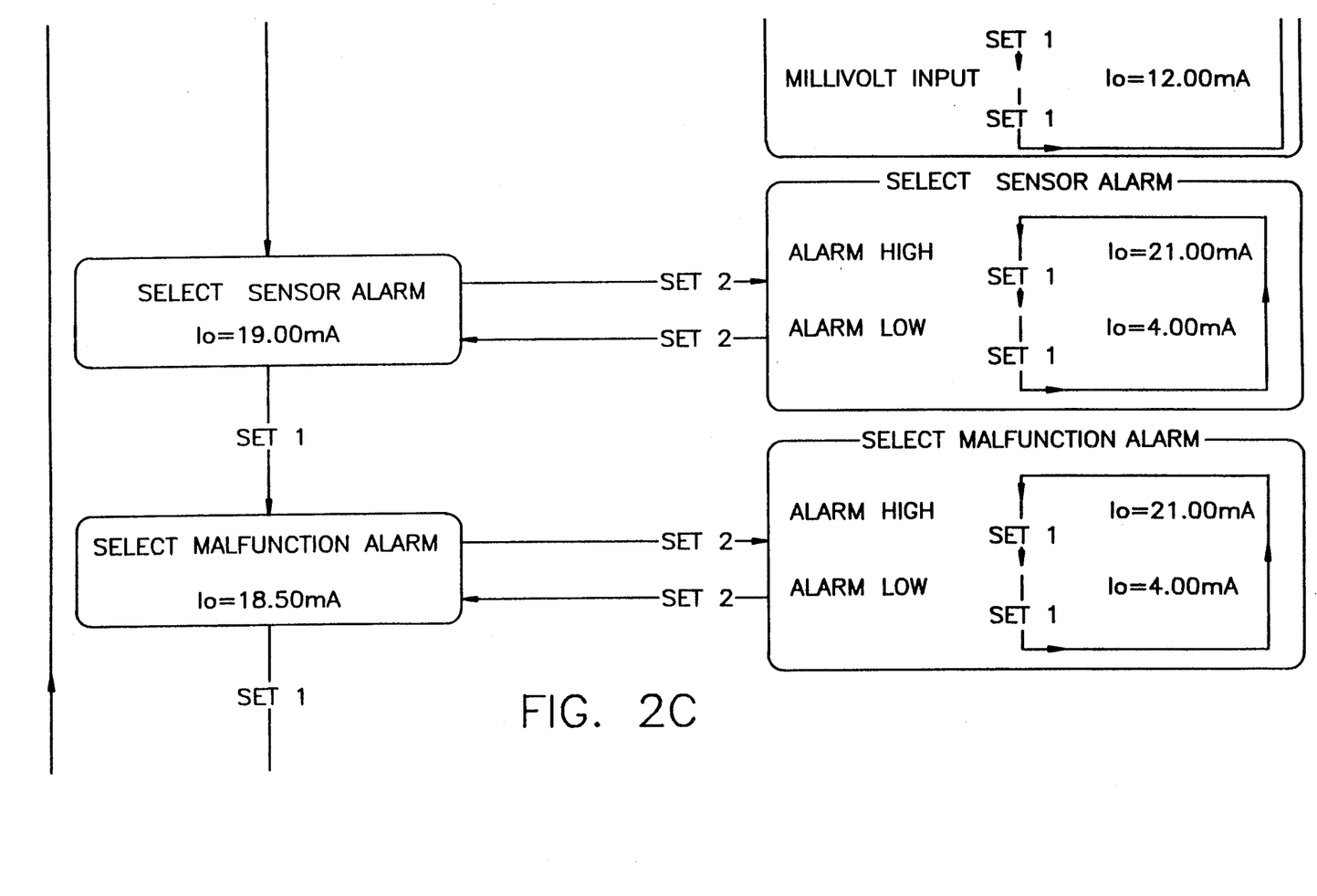
Figure 2D:
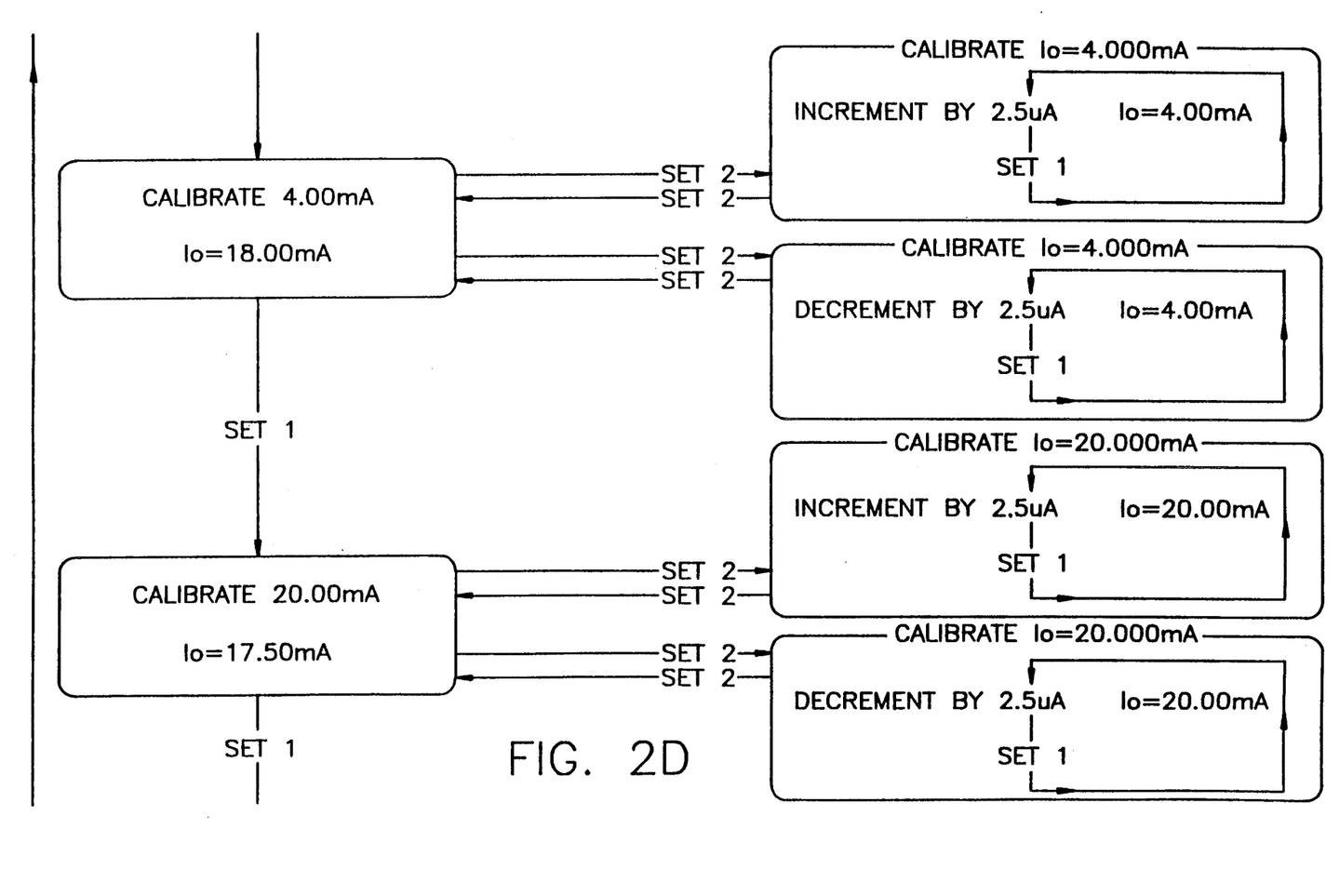
Figure 2E:
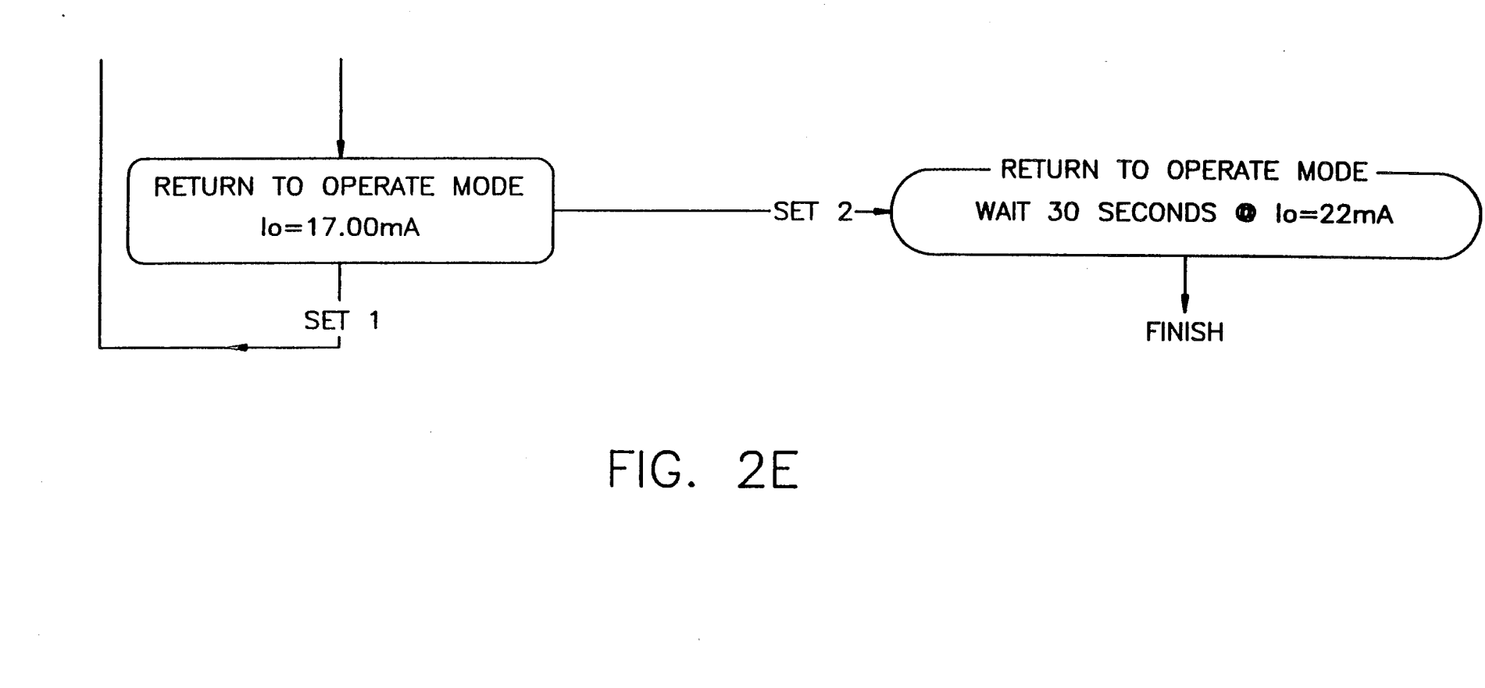

Referring to FIG. 1, a smart two-wire remote sensor and transmitter 10 embodying the invention inlcudes terminals 16 and 18 to which a termperature sensor 20 of any suitable type is connected by leads 30 and 40. The terminals 16 and 18 are connected by leads 32 and 42 to input terminals of a multiplexer 50. Some sensors may have more than two leads which would be similarly connected.

Also connected to inputs of the multiplexer 50 are a temperature sensor 52 (SEN1) used to measure the temperature of the sensor input terminals 16 and 18. This is required for calculating the correct cold junction compensation for external thermocouple sensors. A second internal temperature sensor 54 (SEN2) is also connected to the input of the multiplexer 50 which measures the internal temperature of the transmitter circuitry. An internal voltage reference 56 (VREF) is also connected to the multiplexer to provide a calibration source for the transmitter. A short circuit input 58 (SHORT) is provided for the purpose of correcting for zero drift in the circuitry. When the multiplexer 50 switches to the short circuited input 58 a microcomputer 80 (to be described) reads the output of an analog-to-digital (A/D) converter 76 (to be described) which corresponds to zero voltage input.

A current source 60 is normally not used when a thermocouple (T/C) type of sensor 20 is connected. If a resistance-temperature-device (RTD) type of sensor is connected (not shown) the current soruce provided the necessary small level of constant excitation for the RTD type of sensor.

A switch (SW1) 62 and a switch (SW2) 64 are connected to the SET1 and SET2 terminals 66, 68 respectively. The switches 62 and 64 are also connected by lead 70 to a common or ground terminal 72.

The output of the multiplexer 50 is coupled through an amplifier 74 to an analog-to-digital converter 76 which is connected to the input of microprocessor 80.

The SET1 terminal 66 is connected by a lead 82 to an S1 input terminal on the microprocessor and the SET2 terminal is connected to an S2 input terminal on the microprocessor by a lead 84. The leads 82 and 84 are connected through similar resistors 86 to a positive voltage source V1 of about 5 volts.

The transmitter of 10 is under the control of the microprocessor 80 which is supported by a RAM (Random Access Memory) 90 for temporary storage, by an EPROM (Electrically Programmable Read Only Memory) 100 for program storage, and an EEPROM (Electrically Erasable Programmable Read Only Memory) 110 for the storage of calibration constants and set-up parameters.

It should be noted that every step of the operation of this transmitter is totally under the control of the software program which is stored in the EPROM 100. This software program may be written in any one of many different computer languages such as Assembly language, the C programming language, or the Pascal language or many others.

The output from the microprocessor 80 is coupled through isolation circuits 112 to a digital-to-analog (D/A) converter 160 which is connected to the input of an amplifier 170. The output of the amplifier 170 is connected to a metal oxide semiconductor field effect transistor (MOS FET) device 172 which itselt is connected to output terminal 130.

The isolator 112 is also connected by a lead 175 to the device 172 and by a lead 177 to one input of a power converter 180 the second input of which is connected to output terminal 140.

Across the output terminals 130 and 140 are connected a 24 volt power supply 150 in series with a milliammeter 160 and an optional load resistor 178.

The smart temperature transmitter 10 receives the power for its operation form the 24 volt power supply 150 through the output terminals 130 and 140. The power obtained through these output terminals is applied to the power converter 180. The function of the power converter is to convert the power from the output terminals 130 and 140, which may vary in voltage from 10 to 24 volts, to a steady low voltage such as 5 VDC to power the D/A converter and the amplifier 170. The power converter then applies some power through an isolation transformer 185 to another power converter 190 to proivde additional steady 5 VDC power to operate the microprocessor 80, the memories 90, 100, 110, the A/D converter 76, the input amplifier 74 input multiplexer 50 and current source 60. The isolation transformer helps isolate the output circuitry from the input circuitry and thus avoid undesirable ground loop currents.

The apparatus and the method of the invention for configuration of a smart transmitter are used as follows: First, during the manufacture of the transmitter, a program is stored in EPROM 100, which tells the microprocessor exactly what to do in any of its operating modes. The program is associated with and permits the operation represented by the flowchart of FIG. 2. In addition, during the manufacture of each transmitter 10 certain calibration constants, which are unique to each transmitter, are stored in the EEPROM memory 110. These constants are determined during a calibration of the transmitter at the time of its manufacture.

The following discussion illustrates the method of configuring a transmitter 10 but it is set forth in terms of reconfiguring a working transmitter.

If the user wishes to change any of the parameters of a transmitter to meet some new requirements, the transmitter must be "told" what those new requirements are. For example to change the sensor from a type J thermocouple to a type S thermocouple one proceeds as follows:

After the transmitter has been powered up the microprocessor 80 resets itself and the software program stored in its PROM memory 100 tells it to perform as a normal temperature transmitter. The set-up procedure is started by momentarily closing switch 62 (SW1). The microprocessor 80 is programmed through software to continually look at its port S1 many times per second to see what logic state this port is in. Whenever switch 62 (SW1) is not activated, the resistor 86 (R1) connected to the +5 volt supply maintains port S1 at a high logic level. However, when switch 62 (SW1) is closed, the port S1 is shorted to the internal common point 72 causing the potential of port S1 to drop to 0 volts. The microprocessor now detects a low logic level at its port S1. Once this low logic level is detected at port S1, the microprocessor, through its software, knows that it must output to its D/A converter 120 such information that will result in an output current of 21.0 mA at the milliammeter 160. The microprocessor determines from previous calibration data stored in its EEPROM memory 110 what information needs to be sent to the D/A converter 160 to accomplish this and then proceeds to send that information to the D/A converter.

The user sees the 21.0 mA output current, the visual feedback, and concludes that the machine has responded properly to his command. The flow chart shows that after "hitting" SET1 the first time the output current should rise to 21 mA.

Continuing with the objective of changing the sensor from a type J to a type S thermocouple, the flow chart indicates that one must proceed to the "Select Sensor" entry in the flow chart. Therefore, the user must momentarily close switch 62 (SW1) again. The microprocessor, which is continually scanning, that is looking at the logic level on port S1, will again detect a low logic level. The software program in the memory of the microprocessor tells it that this second occurrence of a low logic level at port S1 requires that the output current be changed to 20.5 mA. The microprocessor correspondingly outputs the appropriate information to the D/A converter 120 to change the output current as required.

The user now again momentarily activates switch 62 (SW1). Again as the microprocessor scans its port S1, it detects a momentary low logic level. It now responds by outputting through its D/A converter 160 data that results in a 19.5 mA output current.

The user observes the 19.5 mA output current on the milliammeter 160, and concludes that this is the correct place in the main menu of the flow chart, and that he must now activate the SET2 terminal 68 to get over to the Select Sensor submenu shown in the flow chart of FIG. 2. Therefore, the user now momentarily closes switch 64 (SW2).

The microprocessor is continually scanning, looking at, the logic state of both ports S1 and S2. Therefore, the microprocessor 80 now detects, for the first time in this procedure, a momentary low logic level at its port S2. Upon detecting this low logic level at S2, the microprocessor 80, through its software program, determines that it must now output a current equivalent to the presently selected sensor, which is the type J thermocouple. According to the flow chart of FIG. 2 that current is 6.00 mA. The microprocessor proceeds to output through its D/A converter the signal required to produce an output current of 6.00 mA. The user observes this 6.00 mA current and confirms that it corresponds to the type J thermocouple setting according to the flow chart.

Now the user wishes to change this sensor setting, and according to the directions given in the flow chart, he activates the SET1 terminal, momentarily closing switch 62 (SW1). This causes the logic level at port S1 to change momentarily from a high logic level to a low logic level. The microprocessor interprets this condition as a request to change the output current to 6.50 mA.

The user recognizes that in order to reach the entry in the flowchart labeled type S, the SET1 terminal must be activated several more times. Each new time the SET1 terminal is momentarily activated, the microprocessor recognizes the sudden change of logic level from high to low, and it proceeds to increment its output current each time by 0.5 mA. After the user has activated the SET1 terminal four times, the output current has increased to 8.0 mA which corresponds to the type S thermocouple. The user has also confirmed that he has arrived to the correct setting by observing the 8.0 mA output current on the milliammeter.

Now, according to the instructions on the flowchart, the user activates switch 62 (SW2) again. When the microprocessor detects a sudden momentary low logic level at its port S2, it knows through its software program that is has to do the following:

1) Return to the main menu entry in the flowchart, which is the Select Sensor entry, and accordingly change the output current to 19.5 mA.

2) Take action to store in its EEPROM non-volatile memory 110 the fact that the newly selected sensor is the type S thermocouple. This means that from now on the microprocessor must refer to the table in its PROM memory which represents the transfer function of the type S rather than the type J thermocouple.

Now if the user wishes to perform no other set-up functions, then the transmitter could be returned to its normal operating state. This is done by repeatedly activating the SET1 terminal, that is repeatedly closing momentarily switch 62 (SW1). Each time the microprocessor detects the corresponding low level at its S1 terminal and decrements its output current by 0.5 mA. When an output current of 17.0 mA is reached, the user stops closing switch 62 (SW1).

At this point, for the purpose of this example, the user wishes to terminate the set up procedure and return the transmitter to its normal operating mode. Therefore, the user will now activate switch 64 (SW2). The microprocessor detects the momentary low logic level at its input port S2 and causes its output current to rise above 22 mA. At the same time the microprocessor knows through its software program that it must reset itself and when it becomes operational again, it is in its normal operating mode. Now, as a result of this set up procedure just described, the instrument is set to follow the temperature to millivolt transfer characteristic of a type S thermocouple.

It can be readily seen that in a similar manner any of the other functions indicated on the flow chart can also be set up or changed. In the instrument for which this flowchart was prepared these other parameters are: Set Zero, Set Span, Select Sensor Alarm, Select Malfunction Alarm, Calibrate 4.00 mA, Calibrate 20.0 mA. These listed parameters that could be set up with this technique are not all inclusive. A similar instrument could be designed in which there may be many other set-up parameters that could also be set up in a similar manner.

Let us examine another example. With an instrument producing an analog output signal, such as the 4.00 mA to 20.00 mA signal of this instrument, it is necessary to set the desired "ZERO" and "SPAN". This means that a certain lowest temperature expected to be measured in a process will be made to correspond to the 4.00 mA output current. Similarly a certain highest expected temperature in that process will be made to correspond to 20.00 mA of output current. This is known in the language of this industry as "setting the ZERO and the SPAN". This type of information must also be communicated to the transmitter.

Let us now start the set-up procedure over again. The user first momentarily closes switch SW1. This is detected by the microprocessor which then causes its output current to change to 21.00 mA. This position in the main menu also corresponds to the function entitled "Set Zero".

The user now momentarily closes switch SW2. The microprocessor detects the momentary low logic level at its input port S2 and causes the output current to drop to 4.00 mA. This signifies to the user that the instrument has responded to his command and is ready to accept the mV input which is to correspond to the lowest measured temperature.

The user now connects the correct sensor (type S thermocouple according to the previous set-up) to the input terminals of the transmitter. Then the user subjects this thermocouple sensor to the temperature which he desires to correspond to the 4.00 mA low limit, say 250 degrees C. (Alternatively the corresponding millivolt signal could be applied to the same input terminals.) Now the transmitter sees the signal which is intended to be the low limit of the measurement range. The microprocessor controls the A/D to measure this voltage and through its software recognizes a certain count value (millivolt reading) from its A/D converter.

The user now again momentarily closes switch SW2. The microprocessor again detects this momentary low logic level at its port S2 and through its software program it now stores the most recent measurement value from the A/D converter in its non-volatile EEPROM memory. In addition the microprocessor also causes its output to return to the 21.00 mA level. From this time on, whenever the measured temperature drops to this value, the transmitter will output 4.00 mA of output current.

In a similar manner, the user can also set a desired temperature value to correspond to the 20.0 mA top end of the range. This is done as follows:

The user now momentarily closes switch SW1 which is detected and causes the current to drop to 20.5 mA. Now momentarily closing switch SW2 changes the current to 20.0 mA. Now the user must apply the millivolt input that corresponds to the selected sensor signal output at the high end of the range, say that of 850 degrees C. Momentarily closing switch SW2 is again sensed by the microprocessor, causing it to save in its EEPROM memory the millivolt input reading corresponding to the 850 degrees C. high end of the range. In addition the microprocessor also returns the output current to 20.5 mA, signifying to the user that the function has been accomplished.

Now the user can momentarily close switch SW1 again. The microprocessor again interprets the resulting momentary change from high to low logic level as an external command to set the output current to 19.5 mA.

At this point in the flow chart the user can decide to change the sensor again, as was already described earlier, or the user can continue repeatedly to momentarily close switch SW1. This repeated closing of SW1 signals to the microprocessor to decrement its output current in 0.5 mA increments and at each step offer the user the opportunity to alter the function associated with that output current increment.

The procedure that has been just described set the ZERO of the range to 250 degrees C. and the SPAN (high end of the range) to 850 degrees C. As the sensor connected to this transmitter senses temperature between these two limits, the transmitter will produce an output current between 4.0 mA and 20.0 mA which is directly and linearly proportional to the measured temperature.

It should be noted that the only significance associated with outputting these current values during the set-up process is to provide a feedback for the user regarding what state the transmitter is in, that is, what point the user has reached in the flowchart.

In normal operation of the transmitter 10, the microprocessor 80 controls the input multiplexer 50 to sequentially switch through all of its input channels and each time telling the A/D converter 70 to take a reading of the corresponding channel. These readings are: 1) the input short circuited which gives information on the A/D reading that corresponds to zero input, 2) the internal voltage reference 140 which provides the A/D count corresponding to a full scale reading, 3) the sensor input channel, wires 30 and 40, which gives the reading corresponding to the unknown, 4) the internal sensor 120 which provides information on the temperature of the cold junction, and 5) the second internal temperature 130 which provides information on the temperature of the internal circuitry. The microprocessor stores these A/D readings in its temporary memory RAM 90 for further reference.

In performing all of its actions the microprocessor is controlled by the software program which was stored in its permanent EPROM memory 100 during its manufacture.

After the microprocessor 80 has completed one cycle of reading all of the inputs of the multiplexer it proceeds with processing all of this information. It compares this data with calibration constants from its EEPROM 110 memory to determine what zero and full scale corrections to the A/D readings need to be made. The set up information stored in its EEPROM memory tells the microprocessor 80 what sensor is connected and therefore, what transfer function table stored in its EPROM 100 to use. If the sensor is a thermocouple then the microprocessor also uses the internal sensor 120 reading to correct for the cold junction temperature.

Based on all of these measurement results and data stored in EPROM and EEPROM the microprocessor 80 calculates the correct value to output to the D/A. Once this digital data is outputed to the D/A a suitable analog signal appears at the input of the amplifier 170 which then drives the output current at terminals 180 and 190 to the appropriate level between 4.0 mA and 20 mA.

This entire cycle is repeated approximately once each second. New readings are taken through the input multiplexer, this new information is processed by the microprocessor 80, and the D/A output is updated if any change is necessary. If the temperature sensed by sensor 20 changes, it will affect the results of the calculations performed by the microprocessor and that results in a different D/A output and a corresponding change in the output current of the transmitter.

As described above, the transmitter 10 can be configured to operate within a selected range of desired temperature. For example, the transmitter 10 described, may be set up for a 4.0 mA output to correspond to a measured temperature of 300 degrees C. and a 20.0 mA output to correspond to a measured temperature of 600 degrees C. If the microprocessor 80 determines that the temperature sensed by the thermocouple 20 is 450 degrees C. then the microprocessor will output a digital word to the D/A converter which will result in a 12.0 mA {(20−4)/2=12} output current.

The smart transmitter of the present invention has many advantages one of which is that it can achieve linearization to 0.05 degree C. accuracy of 8 types of thermocouples and three types of RTD devices. This linearization is performed over the entire useful temperature range of the device.

The present invention has a cold junction compensation technique whose accuracy over the entire useful range of any thermocouple is far superior to any product on the market.

The transmitter of the present invention has the unique feature of repetitive self correction and calibration against an on-board NBS traceable standard over its entire specified ambient operating temperature range of −30 C. to +60 C. The accuracy of the invention is virtually unaffected over this entire ambient temperature range.

MULTI-SENSOR COMPATIBILITY

Most analog transmitters available on the market are designed for either one type of RTD or one type of thermocouple. Some include a mechanical switch to accommodate a small variation in the selection of sensors. Furthermore, most classical transmitters limit the range of temperature to only part of the sensor's capability. Accordingly, each application requires a different model transmitter customized for a particular sensor and temperature range. The number of different models that can be defined in this manner can be rather large and costly to stock and support.

The transmitter of the present invention stores the characteristic tabular data for 3 commercially used RTD and 8 thermocouple sensors over their entire usable temperature range and is able to recall any of this information in response to a digital command from a data terminal, or through a unique circuit method called "tap-feedback". Furthermore, it can also be configured to measure voltage over the range of −10 to +120 millivolts, and numerous other input capabilities. All these variations are available in a single model of the transmitter without even opening the electronics except through its top terminals or its digital communications link.

DIGITAL COMMUNICATION

Most commercially available temperature transmitters use analog electronics and are only capable of producing an analog output, mostly in the form of a 4 to 20 mA current signal. They do not provide any digital communications. All adjustments, calibrations, changes in operating mode are achieved by means of potentiometers and switches or jumpers that the user must activate after partially disassembling the unit.

The transmitter of the present invention provides not only the 4 to 20 mA analog signal, but it is also capable of operating in the digital mode, receiving and transmitting digital information and data to a data terminal or a computer. Furthermore, both the analog signal or the digital communications are accomplished over the same pair of wires. Through this digital communications capability the device can be reconfigured to any of its numerous different modes of operation either remotely or locally, but without the need to physically alter the unit. Additionally the unit can be placed in the digital mode wherein the measured parameter is output in digital form to a data terminal or computer in highly accurate form. In this digital mode the accuracy limitation imposed by the analog signal current loop is eliminated and the full accuracy of the unit is available. This dual mode of operation allows this unit to be installed as a conventional analog current transmitter, or it can be upgraded to any time to the more advanced and higher accuracy digital mode.

What is claimed is:

1. A remote signal sensor and transmitter and means for configuring parameters therein comprising
    a multiplexer circuit having a plurality of input terminals and an output terminal, a remote sensor connected to selected input terminals of said multiplexer, an analog-to-digital (A/D) converter having an input and an output, the input being connected to the output of said multiplexer, a microprocessor having first second and third input terminals, and an output terminal, the output of said A/D converter being connected to said third input terminal of said microprocessor, said microprocessor having an associated random access memory (RAM) for temporary storage of data, an electrically programmable read only memory (EPROM) for storing a program and an electrically erasable read only memory (EEPROM) for the storage of data used for configuring parameters in said signal sensor and transmitter, a source of potential connectable by an operator by a first lead to said first input terminal on said microprocessor to provide said potential on said first terminal, said source of potential connectable by said operator by a second lead to said second input terminal on said microprocessor to provide said potential on said second terminal, said first and second leads connected through identical resistors to a positive power supply which is normally applied to said first and second terminals on said microprocessor, said microprocessor having said output terminal connected to a load circuit having output terminals, output load terminals connected to said load circuit, a circuit connected across said output load terminals including a low voltage positive power supply in series with an ammeter, and a software program in said EPROM circuit including (1) a first series of steps each related to a specific portion of said sensor and transmitter and (2) a second series of steps each representing a parameter related to a step in said first series, said microprocessor sequencing through said first series of steps of said software program as said potential is applied to said first terminal of said microprocessor and then to an associated step in said second series of steps as said potential is applied to said second terminal of said microprocessor, each transition of said microprocessor to a step in said first series of steps selecting a portion of said signal sensor and transmitter to be configured and each transition of said microprocessor to the associated step in said second series of steps configuring in said sensor and transmitter a specific parameter related to said selected portion of said sensor and transmitter, the value of each configured parameter selected from a step in said second series of steps being stored in said EEPROM and thus comprising a parameter configured in said signal sensor and transmitter.

2. The apparatus defined in claim 1 and including a digital to analog converter coupled between said output terminal of said microprocessor and a load circuit including a voltage source and an ammeter.

3. The apparatus defined in claim 1 and including a chart including (1) a first list of devices each comprising one step in said first series of steps of said program and (2) a second list of parameters each related to one device in said first list and in said second series of steps of said program, each parameter in said first list of said chart having a characteristic current which can be read by an operator on said ammeter, each current reading, as it appears on said ammeter as an operator operates said microprocessor representing to the operator that the microprocessor is at a particular step in said first series of steps of said program, whereby the operator can operate said microprocessor, at a selected step on said first list of said chart, to move to the associated step on the second list of said chart and to the related step in said second series of steps of said program.

4. The method of configuring parameters in a remote sensor and signal transmitter comprising providing a multiplexer having a plurality of input terminals to which a plurality of different types of remote sensors can be connected, providing a microprocessor having an associated random access memory (RAM) for temporary storage of data, an electrically programmable read only memory (EPROM) for storing a program and an electrically erasable read only memory (EEPROM) for the storage of data used for configuring at least one parameter in said signal sensor and transmitter, providing a software program in said EPROM circuit including (1) a first series of steps each related to a specific portion of said sensor and transmitter and (2) a second series of steps each representing a parameter related to a step in said first series and to be configured into the portion of said sensor and transmitter represented by said first step, sequencing said microprocessor through said first series of steps of said software program and then selectively sequencing said microprocessor from a specific first step to an associated step in said second series of steps to configure into memory the parameter represented by said step in said second series of steps, each of said first steps and each of said second steps having a characteristic current associated with it, providing a load circuit including an ammeter coupled to said microprocessor, stepping through said steps of said first series and reading a current in said ammeter to verify that the microprocessor is at each step in said first series of steps in said program, and selecting steps in said second series of steps and reading a current in said ammeter to verify that the microprocessor is at a selected step in said second series.

5. The method defined in claim 4 and including the steps of providing a chart including (1) a first list of devices each comprising one step in said first series of steps of said program and (2) a second list of parameters each related to one device in said first list, each device in said first list of said chart having a characteristic current which can be read by an operator on said ammeter, each current reading, as it appears on said ammeter as an operator operates said program representing to the operator that the microprocessor is at a particular step in said first portion of said program whereby the operator can operate said microprocessor to move from a selected step on said first list of said chart to the associated step on the second list of said chart and the related step in said second portion of said program whereby the parameter selected in said second list is configured in the device represented by the associated step in the first list.

* * * * *